US011884218B2

(12) United States Patent
Uno et al.

(10) Patent No.: US 11,884,218 B2
(45) Date of Patent: Jan. 30, 2024

(54) WIRE GUIDE DEVICE

(71) Applicant: SUMITOMO WIRING SYSTEMS, LTD., Mie (JP)

(72) Inventors: Hiroki Uno, Mie (JP); Hiroshi Inoue, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 825 days.

(21) Appl. No.: 16/965,443

(22) PCT Filed: Jan. 15, 2019

(86) PCT No.: PCT/JP2019/000811
§ 371 (c)(1),
(2) Date: Jul. 28, 2020

(87) PCT Pub. No.: WO2019/150922
PCT Pub. Date: Aug. 8, 2019

(65) Prior Publication Data
US 2021/0053513 A1 Feb. 25, 2021

(30) Foreign Application Priority Data
Feb. 5, 2018 (JP) ................................. 2018-017977

(51) Int. Cl.
*B60R 16/02* (2006.01)
*B60J 5/06* (2006.01)
*H02G 11/00* (2006.01)

(52) U.S. Cl.
CPC ............ *B60R 16/0215* (2013.01); *B60J 5/06* (2013.01); *H02G 11/00* (2013.01)

(58) Field of Classification Search
USPC .................................. 296/146.1, 155; 49/360
See application file for complete search history.

(56) References Cited

U.S. PATENT DOCUMENTS 6,781,058 B1 * 8/2004 DeCicco .............. H02G 11/006
439/162
7,284,785 B2 * 10/2007 Gotou .................. H02G 3/0475
174/72 A (Continued)

FOREIGN PATENT DOCUMENTS

| JP | 2001-151042 A | 6/2001 |
| JP | 2003-025850 A | 1/2003 |
| JP | 2003-312266 A | 11/2003 |

OTHER PUBLICATIONS

International Search Report dated Apr. 9, 2019 for WO 2019/150922 A1 (2 pages).

*Primary Examiner* — Amy R Weisberg
*Assistant Examiner* — Veronica M Shull
(74) *Attorney, Agent, or Firm* — Venjuris, P.C.

(57) ABSTRACT

A wire guide body includes: a vehicle body-side guide portion having a configuration in which a plurality of vehicle body-side link members are coupled so as to form a string and to be capable of being curved as seen in a plan view, the vehicle body-side guide portion being coupled to a vehicle body-side bracket; a door-side guide portion having a configuration in which a plurality of door-side link members are coupled so as to form a string and to be capable of being curved as seen in a plan view, the door-side guide portion being coupled to a door-side bracket; and a relay link member including a vehicle body-side coupling portion that is coupled to the vehicle body-side guide portion, and a door-side coupling portion that is disposed at a position lower than the vehicle body-side coupling portion and that is coupled to the door-side guide portion.

5 Claims, 6 Drawing Sheets

(56) References Cited

U.S. PATENT DOCUMENTS

| | | | | |
|---|---|---|---|---|
| 9,150,168 B2* | 10/2015 | Inoue | .................... | H02G 3/0406 |
| 9,963,092 B2* | 5/2018 | Uno | .................... | H02G 11/003 |
| 2007/0157523 A1* | 7/2007 | Kuhnen | ............... | H02G 11/006 |
| | | | | 49/502 |
| 2011/0308165 A1* | 12/2011 | Lindner | ................ | B60R 16/027 |
| | | | | 49/360 |

* cited by examiner

WIRE GUIDE DEVICE

CROSS REFERENCE TO RELATED APPLICATIONS

This application is a national phase of PCT application No. PCT/JP2019/000811, filed on 15 Jan. 2019, which claims priority from Japanese patent application No. 2018-017977, filed on 5 Feb. 2018, all of which are incorporated herein by reference.

TECHNICAL FIELD

The present invention relates to a wire guide device.

BACKGROUND

Patent Document 1 discloses a wire guide body that can be curved as seen in a plan view by coupling a plurality of link members so as to form a string. Opposite ends of the wire guide body are coupled to a vehicle body-side bracket provided on a vehicle body and a door-side bracket provided on a sliding door, and a plurality of wires are inserted inside the wire guide body. When the sliding door is in a fully closed state, the door-side bracket is located forward of the vehicle body-side bracket, and the wire guide body extends so as to be oblong in the front-rear direction along a step provided in an opening of the vehicle body.

In the process of opening the sliding door, the door-side bracket gradually approaches the vehicle body-side bracket. Accordingly, immediately after the sliding door has started to open, a region of the wire guide body that is located close to the sliding door is curved so as to bulge toward the inside of the vehicle, and thereafter, the wire guide body as a whole is curved into a substantially U-shape. When the degree of opening of the sliding door increases, the door-side bracket is displaced further rearward than the vehicle body-side bracket, and moves rearwardly away from the vehicle body-side bracket. Accordingly, the wire guide body is gradually stretched in the front-rear direction.

PRIOR ART DOCUMENT

Patent Document

Patent Document 1: JP 2003-312266A

SUMMARY OF THE INVENTION

Problems to be Solved

A wire guide body of this kind is routed at a position higher than the upper surface of the step, and, therefore, a part of the wire guide body bulges above the step immediately after the sliding door has started to open. Accordingly, there is concern that a person getting on and off the step may accidentally step on the wire guide body when placing his or her foot on the step.

As a way to prevent the wire guide body from being stepped on, it is conceivable to route the wire guide body in the space below the step. However, the space below the step is secured as a movement path used when a lock arm fixed to the sliding door moves in the front-rear direction by being guided by a guide rail of the vehicle body. Accordingly, routing the wire guide body in this space will result in interference between the wire guide body and a lower arm.

It is also conceivable to route the wire guide body at the same height as the step in the space between the step and the sliding door. However, this is not an effective way to prevent the wire guide body from being stepped on, because the space between the step and the sliding door is narrow, and the link members may interfere with each other when the wire guide body is curved into a substantially U-shape.

The present invention has been completed in view of the above-described circumstances, and it is an object of the invention to prevent the wire guide body from being accidentally stepped on.

Means to Solve the Problem

A wire guide device according to the present invention includes:
a vehicle body-side bracket that can be attached to a vehicle body;
a door-side bracket that can be attached to a sliding door; and
a wire guide body that allows a wire to pass therethrough and that is routed between the vehicle body-side bracket and the door-side bracket,
wherein the wire guide body includes:
a vehicle body-side guide portion having a configuration in which a plurality of vehicle body-side link members are coupled so as to form a string and to be capable of being curved as seen in a plan view, one end of the vehicle body-side guide portion being coupled to the vehicle body-side bracket;
a door-side guide portion having a configuration in which a plurality of door-side link members are coupled so as to form a string and to be capable of being curved as seen in a plan view, one end of the door-side guide portion being coupled to the door-side bracket; and
a relay link member including a vehicle body-side coupling portion that is coupled to another end of the vehicle body-side guide portion, and a door-side coupling portion that is disposed at a position lower than the vehicle body-side coupling portion and that is coupled to another end of the door-side guide portion.

Effect of the Invention

By routing the vehicle body-side guide portion above the step of the vehicle body or at substantially the same height as the step, it is possible to route the door-side guide portion in a region below the upper surface of the step. When the wire guide body is routed in such a configuration, there it is not possible for the door-side guide portion to be accidentally stepped on when a foot is placed on the step even if the door-side guide portion is curved so as to bulge toward the inside of the vehicle when the sliding door has started to open.

DETAILED DESCRIPTION TO EXECUTE THE INVENTION

According to the present invention, the vehicle body-side coupling portion and the door-side coupling portion may be configured to be rotatable relative to each other. With this configuration, the wire guide body can be flexibly deformed in the opening and closing process of the sliding door.

According to the present invention, a coupling configuration between the plurality of vehicle body-side link members and a coupling configuration between the vehicle body-side link member and the vehicle body-side bracket may be configured such that a movable range of the vehicle body-side guide portion can be defined only in a region between an outer edge portion of a step provided on the vehicle body and the sliding door side as seen in a plan view. With this configuration, the vehicle body-side guide portion will not project above the step, and, therefore, the vehicle body-side guide portion will not be stepped on when a foot is placed on the step.

According to the present invention, in a state in which the sliding door is fully closed, the vehicle body-side guide portion may be disposed so as to have a substantially straight shape along the outer edge portion of the step, and the relay link member may be restricted from being curved so as to be displaced to the step side. With this configuration, even if pressing force in the buckling direction is exerted on the vehicle body-side guide portion from the door-side guide portion when the sliding door has started to open, the vehicle body-side guide portion can be prevented from being curved so as to project to the step side.

According to the present invention, the vehicle body-side bracket may be provided with a stopper that can restrict an end of the vehicle body-side guide portion that is located on the vehicle body-side bracket side from being displaced to the step side, in a state in which the sliding door is fully closed. With this configuration, even if pressing force in the buckling direction is exerted on the vehicle body-side guide portion from the door-side guide portion when the sliding door has started to open, the vehicle body-side guide portion can be prevented from being curved so as to project to the step side.

According to the present invention, the door-side bracket may be provided with a holding portion that can hold the door-side guide portion in a shape that is curved so as to bulge in a direction extending away from the sliding door, in a state in which the sliding door is fully closed. With this configuration, the length of the door-side guide portion can be increased as compared with a case where the door-side guide portion has a straight shape when the sliding door is fully closed. Accordingly, even if the curvature of the door-side guide portion increases in the process of opening and closing the sliding door, the degree of bending of the wire at the door-side guide portion can be reduced.

Embodiment 1

Figure 1:
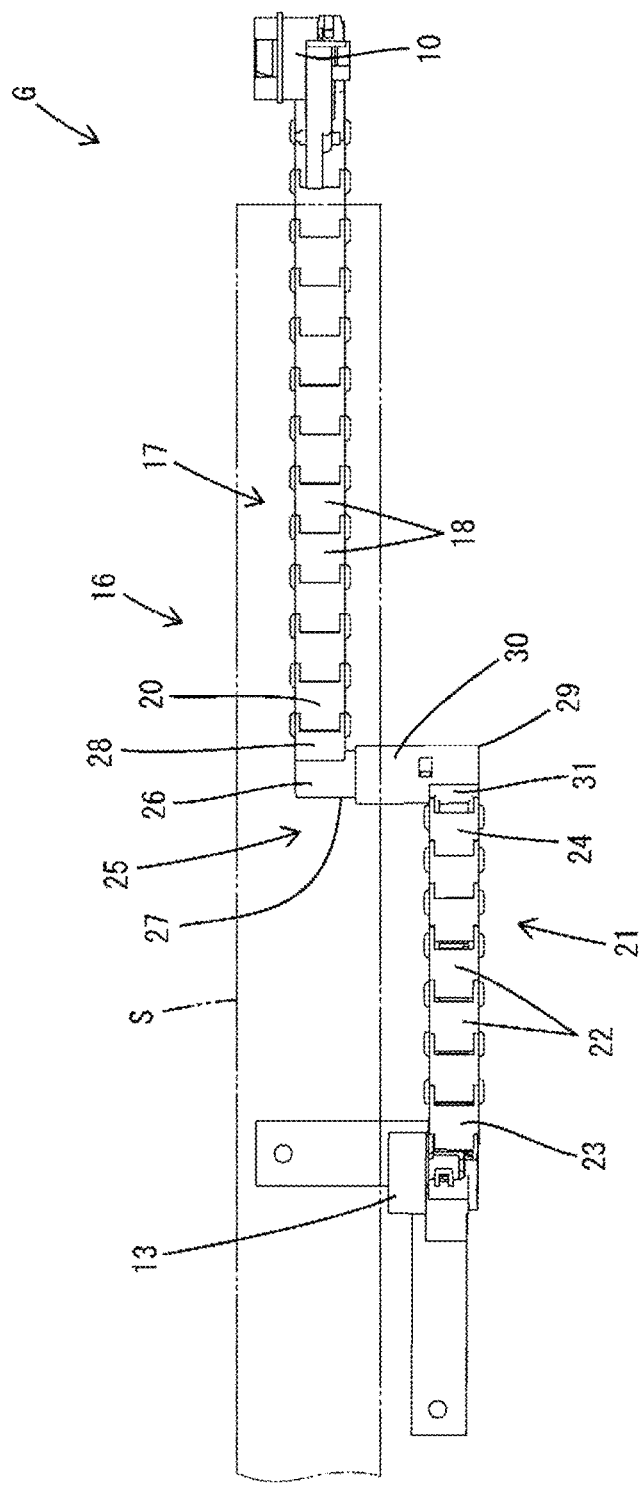
FIG. 1 is a side view of a wire guide device according to Embodiment 1.
Figure 6:
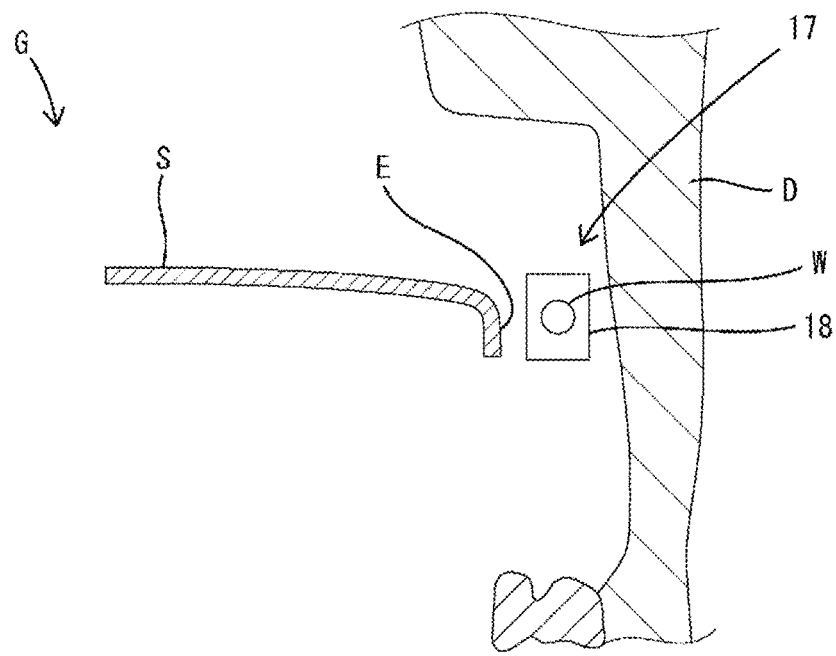
FIG. 6 is a cross-sectional view taken along the line X-X in FIG. 2.
Figure 7:
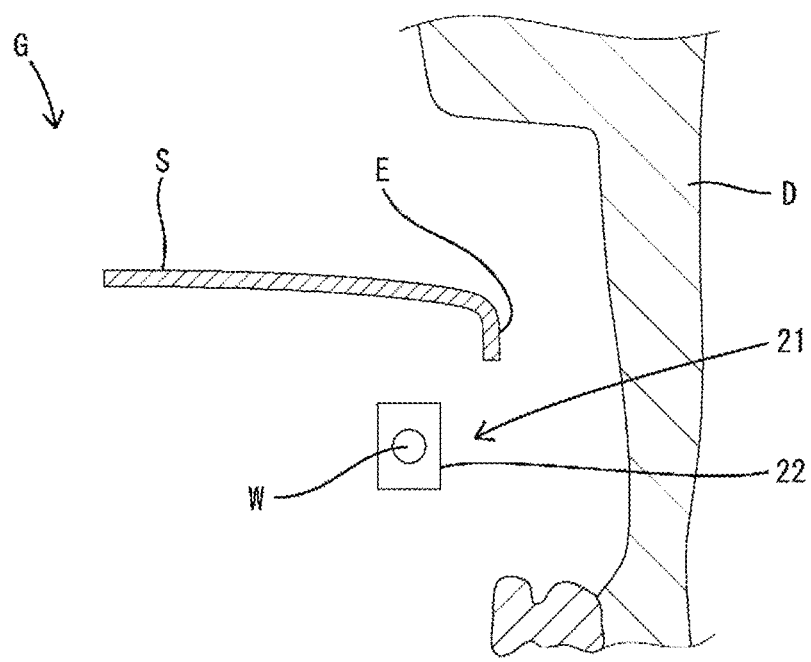
FIG. 7 is a cross-sectional view taken along the line Y-Y in FIG. 2.

Hereinafter, Embodiment 1 of the present invention will be described with reference to FIGS. 1 to 7. In the following description, as for the front-rear direction, the left side in FIGS. 1 to 5 is defined as the front side. As for the vertical direction, the upper side and the lower side shown in FIGS. 1, 6, and 7 are defined as the upper side and the lower side as-is. As for the horizontal direction, the upper side in the FIGS. 2 to 5 is defined as the right side.

A wire guide device G according to Embodiment 1 is routed between a vehicle body B provided with an entrance opening (not shown) on the right side surface thereof, and a sliding door D that opens and closes the opening. In the present embodiment, for the sake of convenience, an example in which the present invention is applied to the right sliding door D is described. However, the present invention can also be applied to the left sliding door D of the vehicle body B. A horizontal plate-shaped step S for a passenger to place his or her foot thereon when getting on or off the vehicle is provided on the vehicle body B so as to extend along the lower edge of the opening. The shape of the step S as seen in a plan view is a substantially rectangular shape that is oblong in the front-rear direction.

A space in the vehicle body B that is located below the step S is secured as a movement path of a lower arm A. The lower arm A is fixed to a lower end portion of the inner surface of the sliding door D. A distal end portion of the lower arm A that protrudes to the vehicle body B side is slidably attached to a guide rail (not shown) provided below the step S on the vehicle body B. In a state in which the sliding door D is at a fully closed position (see FIG. 2), the lower arm A is located below a front end portion of the step S. In a state in which the sliding door D is at a fully open position (see FIG. 5), the lower arm A is at the same position as a rear end portion of the step S in the front-rear direction, and is located outward of an outer edge portion E of the step S.

The sliding door D moves in an opening and closing direction by being guided by the guide rail. In the process in which the sliding door D moves from the fully closed position to the fully open position, the sliding door D moves obliquely to the right rear thereof in the initial stage of the movement process. From the middle to the final stage of the movement process, the sliding door D moves substantially straight rearwardly, and enters a fully open state.

The wire guide device G includes a vehicle body-side bracket 10 that is to be fixed to the vehicle body B, a door-side bracket 13 that is to be fixed to the sliding door D, and a wire guide body 16 that is routed between the vehicle body-side bracket 10 and the door-side bracket 13, and through which a wire W is passed. In the front-rear direction, the vehicle body-side bracket 10 is disposed in proximity to the step S of the vehicle body B at a position rearward of the rear end of the step S. In the vertical direction, the vehicle body-side bracket 10 is disposed at substantially the same height as the step S, or in other words, at a position that is lower than the upper surface of the step S and is higher than the lower surface of the step S. Since the vehicle body-side bracket 10 is disposed above the movement path of a lower arm A, there will be no interference between the lower arm A and the vehicle body-side bracket 10 in the opening and closing process of the sliding door D.

A vehicle body-side insertion hole 11 for allowing passage of the wire W therethrough is formed inside the vehicle body-side bracket 10. The vehicle body-side bracket 10 includes a stopper 12 formed protruding from the outer circumferential surface thereof. In a state in which the sliding door D is at the fully closed position, a vehicle body-side guide portion 17, which will be described later, is locked to the stopper 12, whereby the pivoting (swinging) of the vehicle body-side guide portion 17 in a counterclockwise direction as seen in a plan view is restricted.

In the vertical direction, the door-side bracket 13 fixed to the sliding door D is disposed at a height below the step S, or in other words, at a position lower than the vehicle body-side bracket 10. The door-side bracket 13 is disposed at substantially the same height as the movement path of the lower arm A, but is fixed at a position rearward of the lower arm A in the front-rear direction. Therefore, there will be no interference between the lower arm A and the door-side bracket 13 in the process of opening and closing the sliding door D.

A door-side insertion hole 14 for allowing passage of the wire W therethrough is formed inside the door-side bracket 13. The door-side bracket 13 includes a holding portion 15 formed protruding obliquely rearward from the outer surface thereof. In a state in which the sliding door D is at the fully closed position, the holding portion 15 abuts against a door-side guide portion 21, which will be described later, whereby the door-side guide portion 21 is held in a shape that is curved so as to bulge in a direction extending away from the sliding door D as seen in a plan view.

The wire guide body 16 includes a vehicle body-side guide portion 17, a door-side guide portion 21, and a relay link member 25. The wire guide body 16 has an oblong overall shape, and the wire W is inserted inside the wire guide body 16. The wire guide body 16 is configured to be capable of being curved as seen in a plan view.

The vehicle body-side guide portion 17 is formed by a plurality of vehicle body-side link members 18 that are coupled via vertical shafts so as to form a string. The wire W is inserted inside the vehicle body-side guide portion 17. One of the vehicle body-side link members 18 that is disposed at one end of the vehicle body-side guide portion 17 in the length direction functions as a vehicle body-side end link 19. The vehicle body-side end link 19 is coupled to the vehicle body-side bracket 10 via a vertical shaft. One of the vehicle body-side link members 18 that is disposed at the other end of the vehicle body-side guide portion 17 in the length direction functions as a vehicle body-side relay end link 20.

The door-side guide portion 21 is formed by a plurality of door-side link members 22 that are coupled via vertical shafts so as to form a string. The wire W is inserted inside the door-side guide portion 21. One of the door-side link members 22 that is disposed at one end of the door-side guide portion 21 in the length direction functions as a door-side end link 23. The door-side end link 23 is coupled to the door-side bracket 13 via a vertical shaft. One of the door-side link members 22 that is disposed at the other end of the door-side guide portion 21 in the length direction functions as a door-side relay end link 24.

The relay link member 25 includes an internally fitted member 26 including a cylindrical inner tube portion 27 whose axis is directed in the vertical direction, and an externally fitted member 29 including a cylindrical outer tube portion 30 whose axis is directed in the vertical direction. The relay link member 25 has a configuration in which the internally fitted member 26 is internally fitted to the externally fitted member 29 so as to be coaxial therewith. The internally fitted member 26 and the externally fitted member 29 are assembled so as to be restricted from being displaced relative to each other in the vertical direction, and to be rotatable relative to each other. An upper end portion of the internally fitted member 26 protrudes above the upper end of the externally fitted member 29.

A vehicle body-side coupling portion 28 protruding radially outward from the outer circumference of the internally fitted member 26 (inner tube portion 27) is formed at an upper end portion of the internally fitted member 26 (upper end portion of the relay link member 25). The vehicle body-side relay end link 20 of the vehicle body-side guide portion 17 is coupled to the vehicle body-side coupling portion 28 so as to be pivotable relative thereto via a vertical shaft. A door-side coupling portion 31 protruding radially outward from the outer circumference of the externally fitted member 29 (outer tube portion 30) is formed at a lower end portion of the externally fitted member 29 (lower end portion of the relay link member 25). The door-side relay end link 24 of the door-side guide portion 21 is coupled to the door-side coupling portion 31 so as to be pivotable relative thereto via a vertical shaft.

Since the door-side coupling portion 31 is located below the vehicle body-side coupling portion 28, the door-side guide portion 21 is routed at a position lower than the vehicle body-side guide portion 17. That is, the shape, as seen in a side view, of the wire guide body 16 (wire guide device G) that is stretched straight is a shape in which the vehicle body-side guide portion 17 and the door-side guide portion 21 have a height difference, and are bent in a crank shape (in a step-like shape) at the relay link member 25.

When the vehicle body-side bracket 10 of the wire guide device G is fixed to the vehicle body B, the vehicle body-side guide portion 17 is routed in substantially the same height region as the vehicle body-side bracket 10 (i.e., at substantially the same height as the step S). When the door-side bracket 13 is fixed to the sliding door D, the door-side guide portion 21 is routed in substantially the same height region as the door-side bracket 13 (i.e., at a height below the step S).

Figure 2:
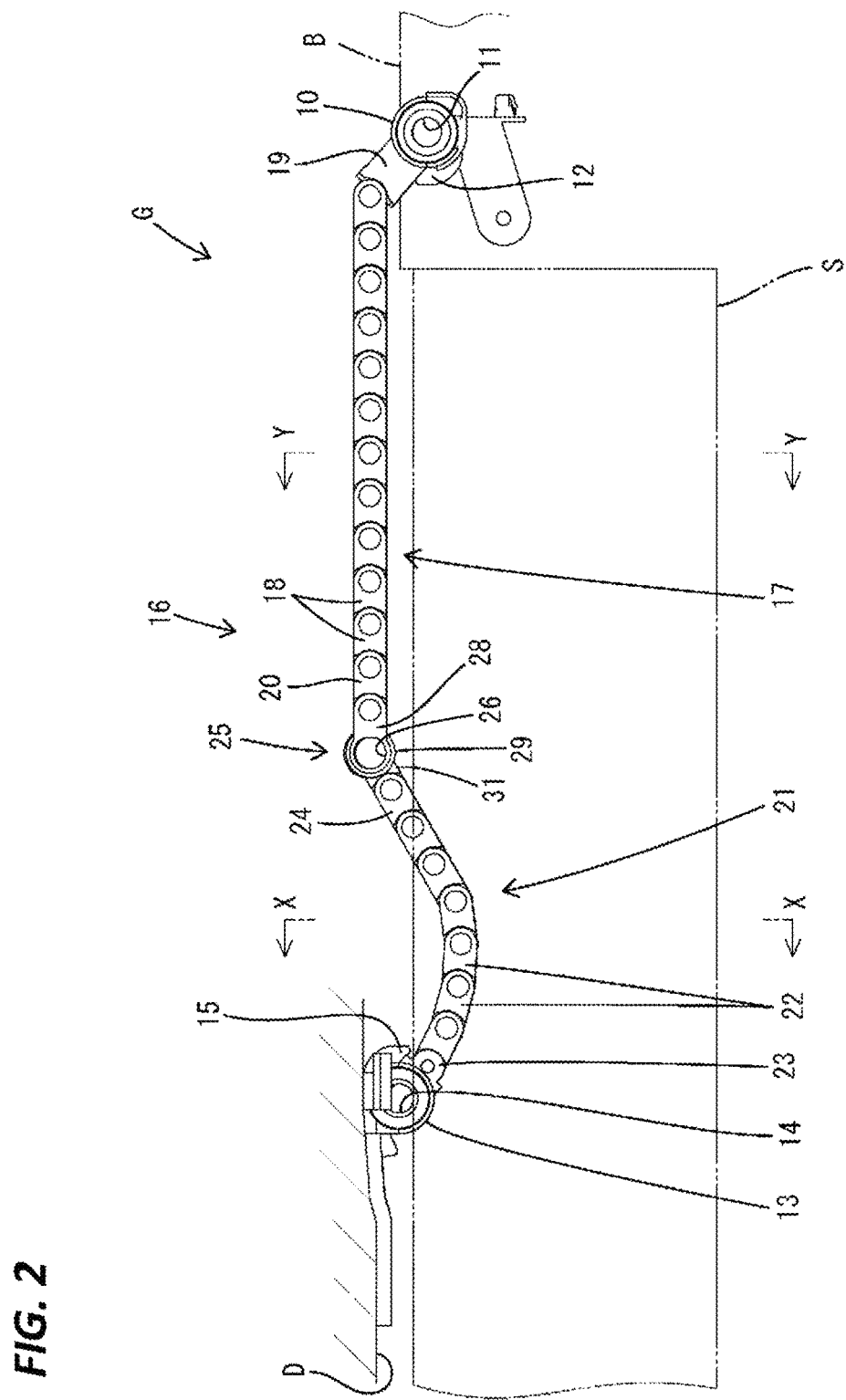
FIG. 2 is a plan view of the wire guide device, showing a state in which the sliding door is at a fully closed position.

In a state in which the sliding door D is at the fully closed position, the door-side bracket 13 and the lower arm A are located forward of the vehicle body-side bracket 10, and, as shown in FIG. 2, the vehicle body-side guide portion 17 is stretched in the front-rear direction so as to have a substantially straight shape along the outer edge portion E of the step S. At this time, the vehicle body-side guide portion 17 is housed in a relatively narrow space between the outer edge portion E of the step S and the inner surface of the sliding door D (see FIG. 6). In this state, the vehicle body-side guide portion 17 is restricted from swinging or pivoting to the step S side (in a counterclockwise direction as seen in a plan view) as a result of the vehicle body-side end link 19 being locked to the stopper 12 of the vehicle body-side bracket 10.

Furthermore, as a result of the adjacent vehicle body-side link members 18 being locked to each other, the vehicle body-side guide portion 17 is also restricted from being curved so as to cause the vehicle body-side relay end link 20 to be displaced in the counterclockwise direction as seen in a plan view (so as to bulge to the sliding door D side). Therefore, the vehicle body-side guide portion 17 will not overlap the upper surface of the step S as seen in a plan view. In addition, when the sliding door D is at the fully closed position, the stopper 12 allows the vehicle body-side relay end link 20 to be displaced in a clockwise direction as seen in a plan view (direction extending rightwardly away from the step S).

In a state in which the sliding door D is at the fully closed position, the straight-line distance between the door-side bracket 13 and the relay link member 25 is shorter than the overall length of the door-side guide portion 21. Also, since the holding portion 15 of the door-side bracket 13 abuts against the door-side end link 23, the door-side end link 23 protrudes obliquely to the left rear (in a direction extending leftwardly away from the sliding door D as seen in a plan view) from the door-side bracket 13.

As a result, the door-side coupling portion 31 and the door-side relay end link 24 protrude obliquely to the left front (in a direction extending leftwardly away from the sliding door D as seen in a plan view) from the inner tube portion 27. Accordingly, the door-side guide portion 21 is held in a curved state so as to bulge in the direction extending away from the sliding door D. In the process of opening and closing the sliding door D, the door-side guide portion 21 is deformed so as to increase or decrease the curvature of the curved shape of the sliding door D at the fully closed position.

Figure 3:
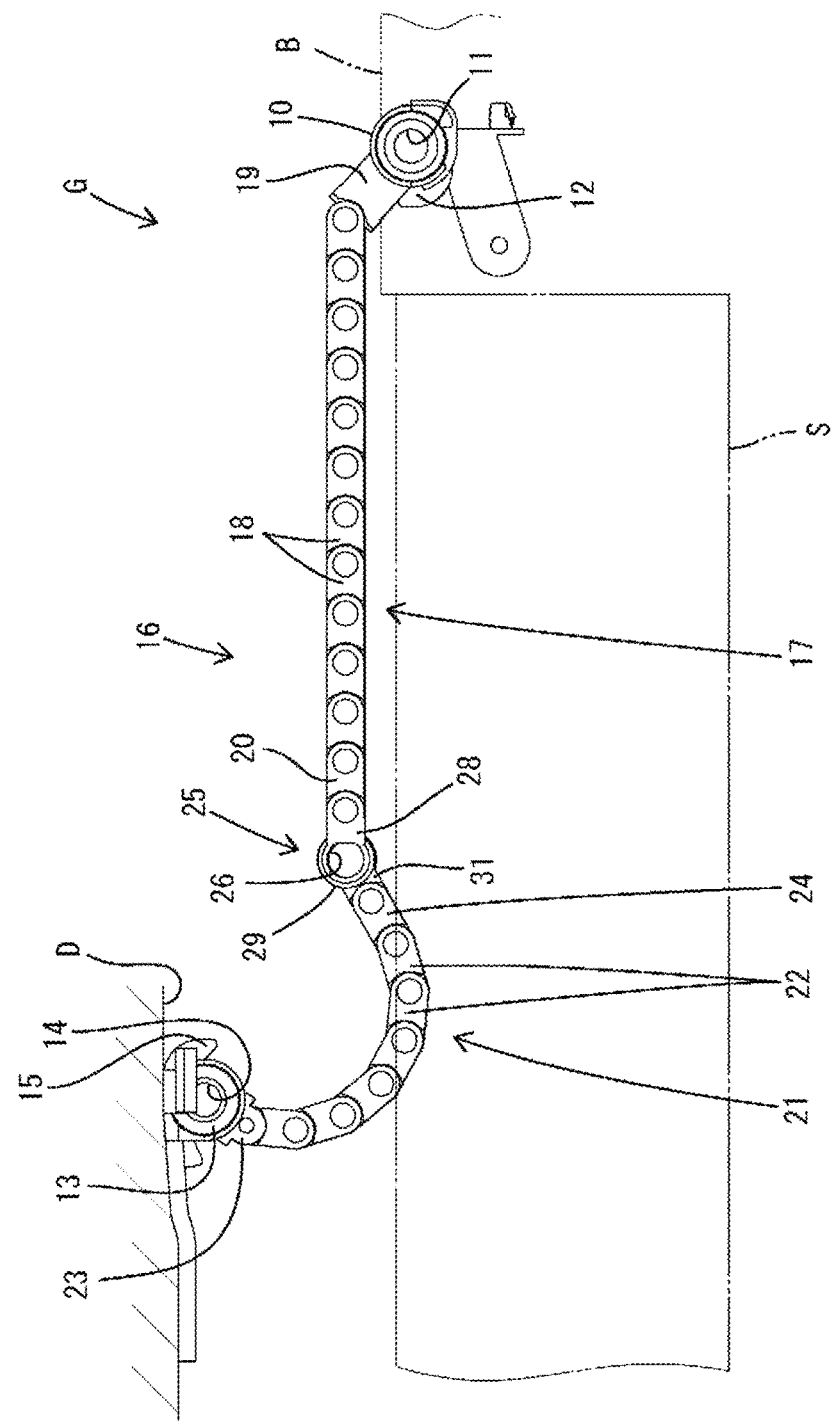
FIG. 3 is a plan view of the wire guide device, showing a state in which the sliding door has started to open from the fully closed position.
Figure 4:
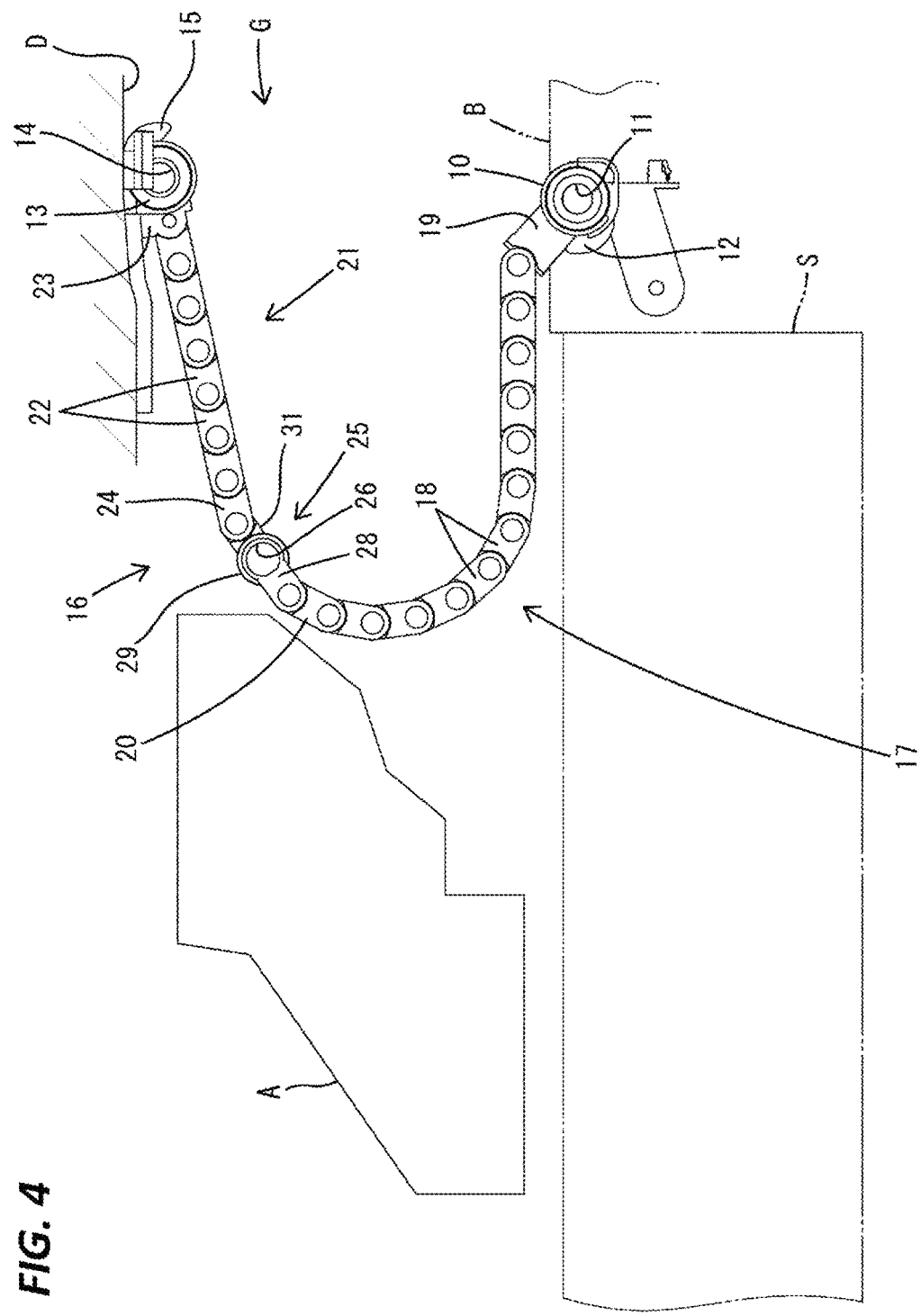
FIG. 4 is a plan view of the wire guide device, showing a state in which the degree of opening of the sliding door has increased from that in the state shown in FIG. 3.
Figure 5:
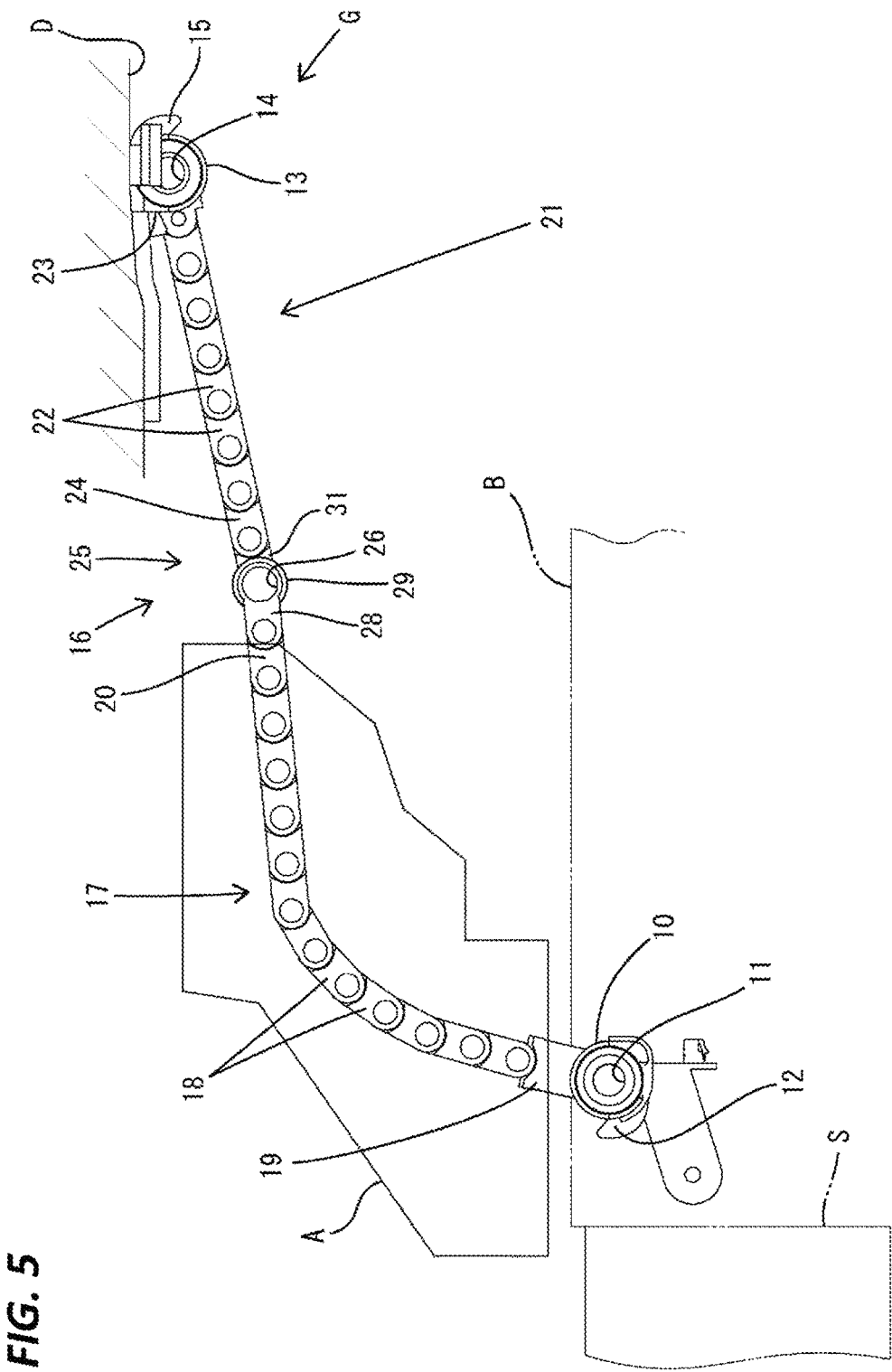
FIG. 5 is a plan view of the wire guide device, showing a state in which the sliding door is at a fully open position.

In the process of moving the sliding door D at the fully closed position to the fully open position, when the sliding door D has started to open, the door-side bracket 13 approaches the relay link member 25 while being displaced obliquely to the right rear thereof. Accordingly, pressing force in the buckling direction is exerted on the vehicle body-side guide portion 17 from the door-side guide portion 21. However, since the vehicle body-side guide portion 17 is restricted from being displaced in the direction in which the relay link member 25 is caused to approach the step S side, the straight shape along the outer edge portion E of the step S is maintained. Accordingly, as shown in FIGS. 2 and 3, the door-side guide portion 21 is gradually curved so as to increase the curvature thereof as seen in a plan view.

As the sliding door D gradually opens from this state, the door-side bracket 13 is displaced so as to be turned substantially about the relay link member 25. Accordingly, the door-side guide portion 21 is gradually displaced in the clockwise direction as seen in a plan view while being kept curved. When the degree of opening of the sliding door D further increases, the door-side bracket 13 is displaced further rearward than the relay link member 25, and moves rearwardly away from the relay link member 25. Accordingly, the door-side guide portion 21 that has been curved is stretched into a straight state. At the same time, the relay link member 25 is pulled rearward by the door-side bracket 13. Accordingly, a region of the vehicle body-side guide portion 17 that is on the relay link member 25 side is curved, and the wire guide body 16 is gradually curved into a substantially U-shape.

Note that the door-side guide portion 21 that is stretched straight extends forward from the door-side bracket 13, and, therefore, there is concern that the door-side guide portion 21 and the relay link member 25 may interfere with the lower arm A. However, since the door-side bracket 13 and the lower arm A are disposed in a positional relationship in which a sufficient interval is provided therebetween, it is not possible for the door-side guide portion 21 and the relay link member 25 to interfere with the lower arm A.

In the process in which the door-side bracket 13 moves from a position located obliquely to the right front of the vehicle body-side bracket 10 to a position located obliquely to the right rear thereof, a state in which the wire guide body 16 as a whole is curved in a substantially U-shape is maintained. Then, when the sliding door D comes close to the fully open state, and the relay link member 25 is displaced further rearward than the vehicle body-side bracket 10, the curved shape of the wire guide body 16 gradually changes into a substantially J-shape.

The wire guide device G of the present embodiment includes the vehicle body-side bracket 10 that can be attached to the vehicle body B, the door-side bracket 13 that can be attached to the sliding door D, and the wire guide body 16 that allows the wire W to pass therethrough and that is routed between the vehicle body-side bracket 10 and the door-side bracket 13. The wire guide body 16 includes the vehicle body-side guide portion 17, the door-side guide portion 21, and the relay link member 25.

The vehicle body-side guide portion 17 has a configuration in which the plurality of vehicle body-side link members 18 are coupled so as to form a string and to be capable of being curved as seen in a plan view. One end (the vehicle body-side end link 19) of the vehicle body-side guide portion 17 is coupled to the vehicle body-side bracket 10. The door-side guide portion 21 has a configuration in which the plurality of door-side link members 22 are coupled so as to form a string and to be capable of being curved as seen in a plan view. One end (the door-side end link 23) of the door-side guide portion 21 is coupled to the door-side bracket 13.

The relay link member 25 includes the vehicle body-side coupling portion 28 and the door-side coupling portion 31. The vehicle body-side coupling portion 28 is coupled to the other end (the vehicle body-side relay end link 20) of the vehicle body-side guide portion 17. The door-side coupling portion 31 is disposed at a position lower than the vehicle body-side coupling portion 28, and is coupled to the other end (the door-side relay end link 24) of the door-side guide portion 21. Via the relay link member 25, the door-side guide portion 21 is coupled in a state in which it is routed at a height lower than the vehicle body-side guide portion 17. The relay link member 25 couples the vehicle body-side guide portion 17 and the door-side guide portion 21 to each other such that they have a height difference.

The vehicle body-side guide portion 17 is routed at substantially the same height as the step S of the vehicle body B, and the door-side guide portion 21 is routed in a region lower than the upper surface of the step S. As a result of routing the wire guide body 16 in such a configuration, even if the door-side guide portion 21 is curved so as to bulge toward the inside of the vehicle when the sliding door D has started to open, the door-side guide portion 21 is merely displaced below the step S. Accordingly, the wire guide body 16 (the door-side guide portion 21) will not be accidentally stepped on when a foot is placed on the step S.

Since the vehicle body-side coupling portion 28 and the door-side coupling portion 31 are configured to be rotatable relative to each other, the wire guide body 16 can be flexibly deformed in the opening and closing process of the sliding door D. This can prevent the wire guide body 16 and the wire W from being bent with a large curvature, thus making it possible to prevent the wire W from being damaged.

The coupling configuration between the plurality of vehicle body-side link members 18 and the coupling configuration between the vehicle body-side link member 18 and the vehicle body-side bracket 10 are configured such that the movable range of the vehicle body-side guide portion 17 can be defined only in a region between the outer edge portion E of the step S provided on the vehicle body B and the sliding door D side as seen in a plan view. With this configuration, the vehicle body-side guide portion 17 will not project above the step S, and, therefore, the vehicle body-side guide portion 17 will not be stepped on when a foot is placed on the step S.

In a state in which the sliding door D is fully closed, the vehicle body-side guide portion 17 is disposed so as to have a substantially straight shape along the outer edge portion E of the step S, and the relay link member 25 is restricted from being curved so as to be displaced to the step S side. With this configuration, even if pressing force in the buckling direction is exerted on the vehicle body-side guide portion 17 from the door-side guide portion 21 when the sliding door D has started to open, the vehicle body-side guide portion 17 can be prevented from being curved so as to project to the step S side.

The vehicle body-side bracket 10 is provided with the stopper 12 that can restrict the vehicle body-side end link 19 (end of the vehicle body-side guide portion 17 that is located on the vehicle body-side bracket 10 side) from being displaced to the step S side, in a state in which the sliding door D is fully closed. With this configuration, even if pressing force in the buckling direction is exerted on the vehicle body-side guide portion 17 from the door-side guide portion 21 when the sliding door D has started to open, the vehicle body-side guide portion 17 can be prevented from being curved so as to project to the step S side.

The door-side bracket 13 is provided with the holding portion 15 that can hold the door-side guide portion 21 in a shape that is curved so as to bulge in a direction extending away from the sliding door D, in a state in which the sliding door D is fully closed. With this configuration, the length of the door-side guide portion 21 can be increased as compared with a case where the door-side guide portion 21 has a straight shape when the sliding door D is fully closed. Accordingly, even if the curvature of the door-side guide portion 21 increases in the process of opening and closing the sliding door D, the degree of bending of the wire W at the door-side guide portion 21 can be reduced.

Other Embodiments

The present invention is not limited to the embodiment described by the above statements and drawings, and, for example, the following embodiments also fall within the technical scope of the present invention.

(1) In the above-described embodiment, the vehicle body-side coupling portion and the door-side coupling portion of the relay link member are configured to be rotatable relative to each other. However, the vehicle body-side coupling portion and the door-side coupling portion may be configured to not to rotate relative to each o other.

(2) In the above-described embodiment, the movable range of the vehicle body-side guide portion is defined only in a region between the outer edge portion of the step provided on the vehicle body and the sliding door side as seen in a plan view. However, a part of the vehicle body-side guide portion may overlap the upper surface of the step in the process of opening and closing the sliding door.

(3) In the above-described embodiment, in a state in which the sliding door is fully closed, the vehicle body-side guide portion is disposed so as to have a substantially straight shape along the outer edge portion of the step. However, the vehicle body-side guide portion may be routed in an oblique direction relative to the outer edge portion of the step, or may be routed in a curved path.

(4) In the above-described embodiment, in a state in which the sliding door is fully closed, the door-side guide portion is held in a shape that is curved so as to bulge in a direction extending away from the sliding door. However, the door-side guide portion may be held in a straight shape.

(5) In the above-described embodiment, the vehicle body-side guide portion is routed at substantially the same height as the step of the vehicle body, and the door-side guide portion is routed below the step. However, the vehicle body-side guide portion may be routed above the step of the vehicle body, and the door-side guide portion may be routed below the step. The vehicle body-side guide portion may be routed above the step of the vehicle body, and the door-side guide portion may be routed at a height that is lower than the upper surface of the step and is substantially the same height as the step.

LIST OF REFERENCE NUMERALS

B Vehicle body
D Sliding door
E Outer edge portion of step
G Wire guide device
S Step
10 Vehicle body-side bracket
12 Stopper
13 Door-side bracket
15 Holding portion
16 Wire guide body
17 Vehicle body-side guide portion
18 Vehicle body-side link member
19 Vehicle body-side end link (one end of vehicle body-side guide portion, end of vehicle body-side guide portion on vehicle body-side bracket side)
20 Vehicle body-side relay end link (the other end of vehicle body-side guide portion)
21 Door-side guide portion
22 Door-side link member
23 Door-side end link (one end of door-side guide portion)
24 Door-side relay end link (the other end of door-side guide portion)
25 Relay link member
28 Vehicle body-side coupling portion
31 Door-side coupling portion

What is claimed is:

1. A wire guide device comprising:
a vehicle body-side bracket that can be attached to a vehicle body;
a door-side bracket that can be attached to a sliding door; and
a wire guide body that allows a wire to pass therethrough and that is routed between the vehicle body-side bracket and the door-side bracket,
wherein the wire guide body includes:
a vehicle body-side guide portion having a configuration in which a plurality of vehicle body-side link members are coupled so as to form a string and to be capable of being curved as seen in a plan view, one end of the vehicle body-side guide portion being coupled to the vehicle body-side bracket;
a door-side guide portion having a configuration in which a plurality of door-side link members are coupled so as to form a string and to be capable of being curved as seen in a plan view, one end of the door-side guide portion being coupled to the door-side bracket; and
a relay link member including a vehicle body-side coupling portion that is coupled to another end of the vehicle body-side guide portion, and a door-side coupling portion that is disposed at a position lower than the vehicle body-side coupling portion and that is coupled to another end of the door-side guide portion,
wherein the vehicle body-side coupling portion and the door-side coupling portion are configured to be rotatable relative to each other.

2. The wire guide device according to claim 1,
wherein a coupling configuration between the plurality of vehicle body-side link members and a coupling configuration between the vehicle body-side link member and the vehicle body-side bracket are configured such that a movable range of the vehicle body-side guide portion can be defined only in a region between an outer edge portion of a step provided on the vehicle body and the sliding door side as seen in a plan view.

3. The wire guide device according to claim 2,
wherein, in a state in which the sliding door is fully closed, the vehicle body-side guide portion is disposed so as to have a substantially straight shape along the outer edge portion of the step, and the relay link member is restricted from being curved so as to be displaced to a step side.

4. The wire guide device according to claim 2,
wherein the vehicle body-side bracket is provided with a stopper that can restrict an end of the vehicle body-side guide portion that is located on the vehicle body-side bracket side from being displaced to a step side, in a state in which the sliding door is fully closed.

5. The wire guide device according to claim 1,
wherein the door-side bracket is provided with a holding portion that can hold the door-side guide portion in a shape that is curved so as to bulge in a direction extending away from the sliding door, in a state in which the sliding door is fully closed.

* * * * *